Sept. 1, 1959 R. H. WILCOX 2,902,219

ELECTRONIC MULTIPLIER DATA PROCESSING CIRCUITS

Filed March 10, 1955

INVENTOR
RICHARD H. WILCOX

BY W. R. Maltby
Howard White
ATTORNEYS

United States Patent Office 2,902,219

Patented Sept. 1, 1959

2,902,219

ELECTRONIC MULTIPLIER DATA PROCESSING CIRCUITS

Richard H. Wilcox, Washington, D.C.

Application March 10, 1955, Serial No. 493,584

4 Claims. (Cl. 235—194)

Figure 1:
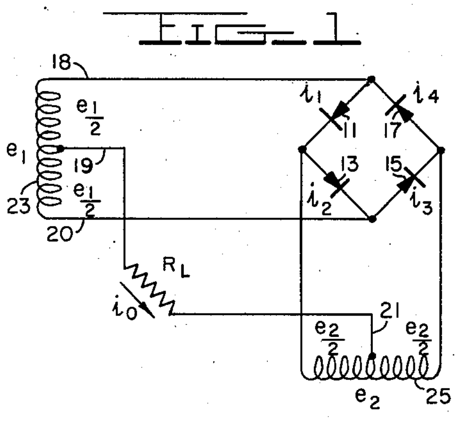

(Granted under Title 35, U.S. Code (1952), sec. 266)

The invention described herein may be manufactured and used by or for the Government of the United States of America for governmental purposes without the payment of any royalties thereon or therefor.

The present invention relates to the means for combining a pair of similar electrical signals and more particularly to the application of a crystal diode ring modulator or circuit for this purpose.

Recent developments have brought about increasing demands for apparatus that will automatically process information. Particularly in the fields where rapid variations or complexity of variables renders human analysis tedious or entirely too slow, emphasis has been placed on automatic processing equipment. Such equipment must be capable of performing all types of mathematical operations. Examples of operations to be performed include multiplication of signals and the determination of auto and cross correlation functions of signals. The correlation functions require the steps of delay, multiplication, averaging or integration in that order. The delay function can be performed easily with the use of artificial or real transmission lines or with the use of a record playback system and the averaging or integration can be achieved by the use of low pass filters, but the multiplication of two signals poses considerable difficulties especially when higher frequencies are involved. For multiplication of signals as well as other mathematical processes, the use of electromechanical devices may suffice where the rate of information reception is low. However, with relatively high frequency reception, problems of accuracy, inertia, and poor transient response render such electromechanical devices inadequate. Other high frequency multiplying systems have been developed which make use of the multigrid electronic tubes. Apparatus for data processing that use electronic tubes suffer the disadvantages of complexity, bulk, and high initial cost as well as high maintenance cost due to frequent and multiple adjustments. Reliability of systems using electronic tubes is lessened by component failure.

According to this invention, it has been found that crystal diodes connected in a ring circuit and suitably fed provide a multiplier circuit which obviates the difficulties encountered by the present data processing equipment. The crystal diodes make a more compact apparatus than either the electromechanical or electronic devices and the frequency range is greatly increased. A crystal diode ring has been operated with good results as high as 1.2 kilo megacycles, a frequency much beyond the satisfactory operating range of either electromechanical or electronic processing devices. Reliability of crystal diodes makes a computer system employing them more dependable than either an electronic or electromagnetic computer system.

In accordance with the invention a ring modulator employing crystal diodes acts as a multiplier in the circuit. It is found that when a ring modulator is connected between two signals in the manner taught by this invention, the resultant signal will be in proportion to the algebraic product of the input signal applied.

An object of the invention is to provide apparatus to combine two signals with a ring modulator or bridge circuit.

Another object of the present invention is to provide apparatus that will combine two electrical signals such that the result will be a multiplication of the signals.

Still another object of this invention is to provide apparatus that will combine two electrical signals from unbalanced transmission lines such that the result will be an average product of the signals.

A further object of this invention is to provide apparatus to determine a correlation function of two electrical signals.

A still further object of this invention is to provide a modified bridge circuit to determine the cross correlation function between two signals, one delayed with respect to the other.

A still further object of this invention is to provide a modified bridge circuit to determine the auto correlation function of a signal, one portion of said signal delayed with respect to the other.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 of the drawings illustrates the basic ring multiplier circuit employing crystal diodes.

Figure 2:
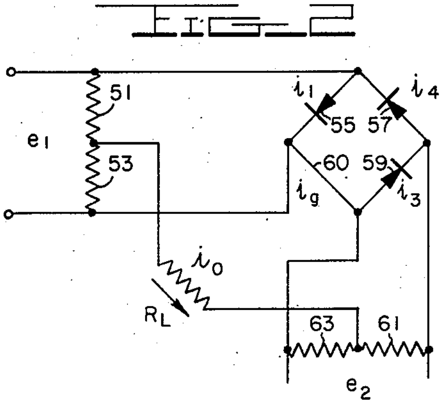

Fig. 2 discloses the circuit diagram of the rapid response multiplier in which an unbalanced crystal diode ring is used.

Figure 3:
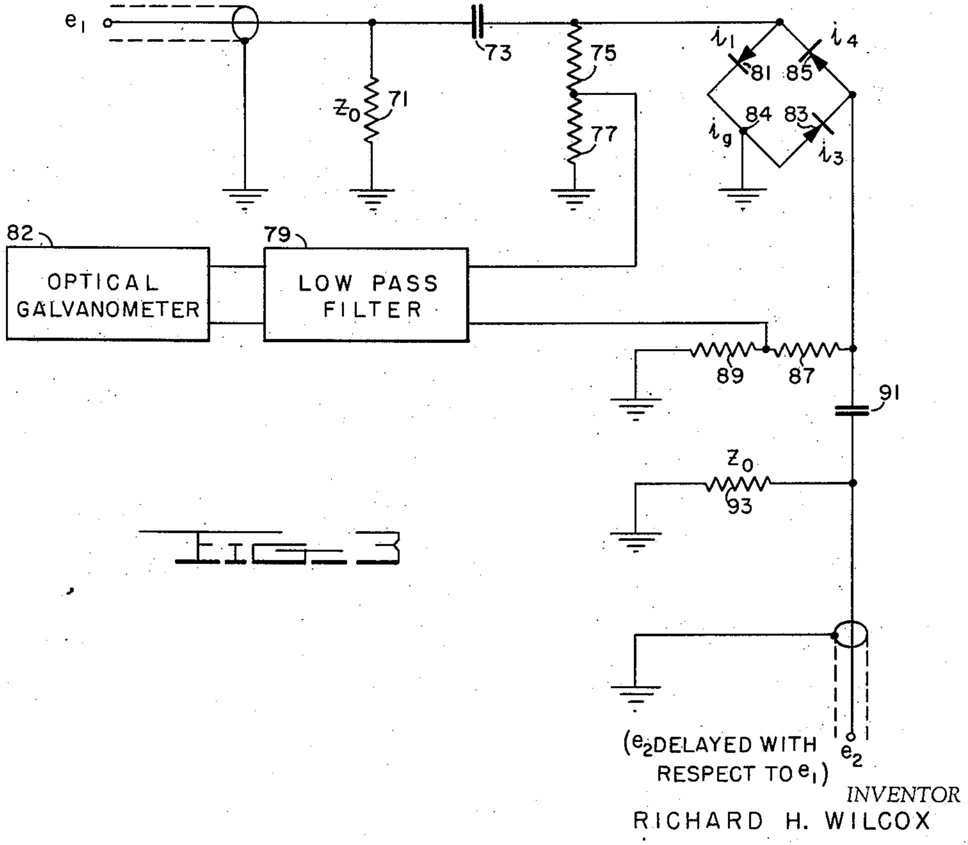

Fig. 3 illustrates the microwave correlator employing an unbalanced crystal diode ring and a low pass filter.

Referring now to Fig. 1 of the drawings indicating the basic multiplier circuit, four crystal diodes 11, 13, 15 and 17 are shown serially connected in a closed loop and poled to permit unidirectional current flow around the loop, thus forming a diode ring circuit. The load circuit containing a load resistor $R_L$ connects between the center taps 19 and 21 of a pair of coils 23 and 25 respectively. One end of coil 23 connects to the juncture of diodes 11 and 17 while the other end connects to the juncture of diodes 13 and 15. Similarly, coil 25 is connected at the junctures of diodes 11 and 13 and 15 and 17.

In the basic multiplier circuit as shown in Fig. 1, it has been found as earlier stated, that the current flowing through the load resistor is proportional to the product of input signals $e_1$ and $e_2$ applied respectively across coils 23 and 25. The current flow through the load resistor according to Kirchoff's law will be:

$$i_0=i_1+i_2+i_3+i_4 \qquad (1)$$

The current flow through a crystal diode is also equal to the current $i=A(E^{\gamma V}-1)$ in which A and $\gamma$ are diode impedance characteristics which remain constant regardless of voltage polarity for small values of current and voltage. The source impedances must be small in comparison to the crystal impedance. Further, the crystal diode impedance characteristics should be similar. Careful selection of the crystal diodes will make this condition possible, then:

$$i_1=+A(\epsilon^{\gamma V_1}-1)=+A\sum_{n=1}^{\infty}\frac{(\gamma V_1)^n}{n!}$$

$$=+A\sum_{n=1}^{\infty}\frac{\gamma^n\left(+\frac{e_1}{2}+i_0R+\frac{e_2}{2}\right)^n}{n!}$$

$$i_2=-A(\epsilon^{\gamma V_2}-1)=-A\sum_{n=1}^{\infty}\frac{(\gamma V_2)^n}{n!}$$

$$=-A\sum_{n=1}^{\infty}\frac{\gamma^n\left(-\frac{e_1}{2}+i_0R+\frac{e_2}{2}\right)^n}{n!}$$

$$i_3=+A(\epsilon^{\gamma V_3}-1)=+A\sum_{n=1}^{\infty}\frac{(\gamma V_3)^n}{n!}$$

$$=+A\sum_{n=1}^{\infty}\frac{\gamma^n\left(+\frac{e_1}{2}+i_0R-\frac{e_2}{2}\right)^n}{n!}$$

$$i_4=-A(\epsilon^{\gamma V_4}-1)=-A\sum_{n=1}^{\infty}\frac{(\gamma V_4)^n}{n!}$$

$$=-A\sum_{n=1}^{\infty}\frac{\gamma^n\left(-\frac{e_1}{2}+i_0R-\frac{e_2}{2}\right)^n}{n!} \quad (2)$$

The value of $\gamma$ for typical microwave crystal diodes used in this invention is about 15 for values of voltage V equal to or less than $\pm 0.1$. With these conditions all terms containing $n$ greater than 4 will be an order of magnitude smaller than the terms in which $n=1$ and can be neglected. Of the remaining terms in the four expressions, some cancel and some are sufficiently small to be neglected so that the following expression results:

$$i_0=\left[A\gamma^2+\frac{A\gamma^4}{24}(e_1^2+e_2^2)\right]e_1e_2 \quad (3)$$

The values of A and $\gamma$ may be determined for any particular crystal diode by observing the current flowing through the diode at two discrete applied voltages. To facilitate calculation one test voltage can be made twice the other, in other words $V_2=2V_1$. The parameters A and $\gamma$ may then be found from the following equations:

$$\gamma=\frac{1}{V_1}\left(1n\frac{i_2-i_1}{i_1}\right) \quad (4)$$

$$A=\frac{i_1}{\epsilon^{\gamma V_1}-1} \quad (5)$$

Referring now to Fig. 2 of the drawings, the Fig. 1 circuit is shown modified to accept signals from unbalanced lines such as coaxial cables with which the common ground would short one of the diodes. In the modified bridge crystal rectifiers 55, 57 and 59 are employed in three legs and a solid conductor 60 replaces the diode normally placed in the fourth leg and may be grounded. Load resistor $R_L$ connects at one end to the juncture of serially connected resistors 51 and 53 and at the other end to the juncture of serially connected resistors 61 and 63. The other ends of resistors 51 and 53 are connected across crystal 55 and to the input terminals for signal $e_1$ while the opposite ends of resistor 61 and 63 are connected across crystal 59 and to the input terminals for signal $e_2$.

The output of the unbalanced bridge manifests itself across load resistor $R_L$. Because one of the crystals is replaced by a solid conductor 60, the current through the load will include a current:

$$ig=\frac{1}{R}\left(-\frac{e_1}{2}+\frac{e_2}{2}\right)=\frac{e_2-e_1}{2R} \quad (6)$$

where $i_g$=current through the conductor 60, resistors 53 and 63 and, of course, load $R_L$. This current will replace $i_2$ and when the three remaining currents are summed with $i_g$ the following equation results:

$$i_0=A\gamma i_0R+\frac{A\gamma^2}{8}(e_1^2+e_2^2)+\frac{3A\gamma^2}{4}(e_1e_2)+\frac{A\gamma^4}{32}(e_1^2+e_2^2)(e_1e_2)$$
$$+\frac{A\gamma}{2}(e_2-e_1)+\frac{A\gamma^2i_0R}{2}(e_2-e_1)-\frac{A\gamma^3e_2e_1}{16}(e_2-e_1)+\frac{e_2-e_1}{R} \quad (7)$$

Provided the source impedances are small with respect to the crystal impedances and $R_L$ is about 1000 ohms or less, the resultant output becomes a function of the product of the voltages $e_1$ and $e_2$ plus a constant bias term $K_2$ that is predictable and may be written:

$$i_0=K_1e_1e_2+K_2 \quad (8)$$

Referring now to Fig. 3 of the drawings, the circuit of Fig. 2 is modified to operate as a microwave correlator circuit having unbalanced inputs suitable for coaxial line feed. As in Fig. 2 the bridge shown is unbalanced, with crystal diodes 81, 83, 85 in three legs and a fourth leg 84 comprising a shorting conductor between crystals 81 and 83. Signal $e_1$ is applied across load resistor 71, designed to match the impedance of the particular coaxial cable from which signal $e_1$ was transmitted to the correlator. Capacitor 73 connects between the input of signal $e_1$ and the juncture of diodes 81 and 85 and isolates the output current from the transmission line. Capacitor 73 provides a conductive path for the A.C. portion of signal $e_1$. Resistors 75 and 77 are serially connected between ground and the common connector of the diode ring and capacitor 73. A conductor connects the juncture of resistors 75 and 77 to one input terminal of a low pass filter 79. Similarly, the coaxial cable carrying signal $e_2$ is connected across a matching impedance 93 and through a condenser 91 across series resistors 87 and 89. Crystal 83 of the diode ring is connected in parallel with the series connected of resistors 87 and 89 to receive the signal $e_2$. The junction of resistors 87 and 89 is connected to the other input terminal of low pass filter 79. Thus it will be seen that the input of filter 79 replaces the load resistor $R_L$ of Fig. 2 and therefore receives a voltage proportional to the product of the input signals plus a bias term under the conditions set forth in Fig. 2, Eq. 8. The output from the low pass filter 79 is applied to an output measuring device such as an optical galvanometer 82.

The delay necessary to the correlation function may be introduced as indicated in Fig. 3 by selection of variant coaxial cable lengths for the respective signals $e_1$ and $e_2$. The low pass filter, also required for correlation, simplifies Eq. 7 since all the terms containing odd powers of $e_1$ or $e_2$ will average to zero leaving only terms containing the product $e_1$ $e_2$ or the quantity $(e_1^2+e_2^2)$ and then $$i_0=\frac{A\gamma^2[24+\gamma^2(e_1^2+e_2^2)]}{32(1-A\gamma R)}(e_1e_2)+\frac{A\gamma^2(e_1^2+e_2^2)}{8(1-A\gamma R)}$$

The first, or product term, is proportional to the average of the instantaneous product of $e_1$ and $e_2$, the second or bias term is a parameter proportional to the average values of $e_1^2$ and $e_2^2$. If the average values of $e_1^2$ and $e_2^2$ are roughly the same the bias term has a value of approximately one-third of the maximum average value of the product term over the operating range of the correlator. The circuit of Fig. 3 provides for delay, multiplication and averaging of a signal, the steps necessary for performing correlation functions. The following correlation functions that have been effected by this invention are the cross correlation function $$\phi(\tau) = \lim_{T \longrightarrow \infty} \frac{1}{T}\int_0^T f_1(t)f_2(t+\tau)\,dt$$

and the auto correlation function $$\phi(\tau) = \lim_{T \longrightarrow \infty} \frac{1}{T}\int_0^T f_1(t)f_1(t+\tau)\,dt$$

where:

$\phi$=function
$t$=time
$f_1$=first function of time (input 1)
$f_2$=second function of time (input 2)
$\tau$=time delay between first and second inputs
$T$=time interval over which the product is averaged In a practical embodiment of this invention the following component values were used: Resistances 71 and 93 of the embodiment of this invention illustrated in Fig. 3 were designed to match the impedance of an RG-8/U cable, the characteristic impedance of this cable being 52 ohms. The center tapping resistors 75, 77 and 87, 89 locating the electrical midpoints of the input signals $e_1$ and $e_2$ have resistance values of 4700 ohms. Blocking capacitors 73 and 91 are 100 mmf. each. The low pass filter is designed to have a cut off frequency preferably less than 10 percent of the minimum input frequencies. Type 1N72 germanium diodes are employed in the unbalanced bridge circuit. The frequency of operation of the particular embodiments of Figs. 2 and 3 is in the 1 kmc. range. The output of the correlator is in the order of a few microamperes and may be measured directly by a sensitive device such as an optical galvanometer or amplified with a differential D.C. amplifier.

The circuits for multiplication and correlation as described are not necessarily to be limited to crystal diodes. Any mpedance means that will satisfy the equations $i=A(\epsilon^{\gamma V}-1)$ or $i=V^2$ such as in square law detectors may be used.

It should be understood, of course, that the foregoing disclosure relates to only a preferred embodiment of the invention and that it is intended to cover all changes and modifications of the examples of the invention herein chosen for the purposes of the disclosure, which do not constitute departure from the spirit and scope of the invention set forth in the appended claims.

What is claimed is:

1. An electrical signal multiplier circuit comprising, first and second unbalanced alternating current signal sources, a first center tapped voltage divider connected across the first unbalanced alternating current signal source, a second center tapped voltage divider connected across the second unbalanced alternating current signal source, an unbalanced circuit including first, second and third unilateral impedance devices connected in a ring, means connecting the first signal source across the first unilateral impedance device, means connecting the second signal source across the second unilateral impedance device, and a load circuit connected between the center taps of the first and second voltage dividers.

2. An electrical signal multiplier comprising, first and second alternating current signal sources having a common output terminal, first, second and third unilateral impedance devices connected in a ring circuit polarized to provide low impedance to current flow in one direction through the ring and high impedance to current flow in the other direction in the ring, means connecting the juncture of the first and second unilateral impedance elements to the common terminal of the unbalanced alternating current signal sources, means connecting the first signal source across the first unilateral impedance device, means connecting the second signal source across the second unilateral impedance device, first and second voltage dividers connected respectively across the first and second unbalanced alternating current signal sources, said voltage dividers having taps thereon at the electrical center points thereof, a load circuit, and means connecting the load circuit between the taps on the first and second voltage dividers.

3. An electrical signal multiplier comprising, first and second signal sources having a common output terminal, first, second and third unilateral impedance devices connected in series to provide a ring having high impedance to current flow in one direction therethrough and low impedance to current flow in the opposite direction, means connecting the common terminal of the signal sources to the juncture between first and second unilateral impedance devices, means connecting the first signal source across the first unilateral impedance device, means connecting the second signal source across the second unilateral impedance device, a load circuit, and means for applying half of the signal from each signal source to the load circuit.

4. An electrical signal multiplier comprising, first and second signal sources having a common output terminal, first, second and third nonlinear impedance devices connected in series to provide a ring having high impedance to current flow in one direction therethrough and low impedance to current flow in the opposite direction, means connecting the common terminal of the signal sources to the juncture between first and second nonlinear impedance devices, means connecting the first signal source across the first nonlinear impedance device, means connecting the second signal source across the second unilateral impedance device, a load circuit, and means for applying half of the signal from each signal source to the load circuit.

References Cited in the file of this patent

UNITED STATES PATENTS 2,700,135 Tolles ---------------- Jan. 18, 1955

OTHER REFERENCES

A Microwave Correlator (Page, Brodzinsky and Zirm), Proceedings of the I.R.E., vol. 41, pp. 128–131; January 1953.